United States Patent
Eliasson et al.

(10) Patent No.: US 7,465,914 B2
(45) Date of Patent: Dec. 16, 2008

(54) SYSTEM AND METHOD OF DETERMINING A POSITION OF A RADIATION SCATTERING/REFLECTING ELEMENT

(75) Inventors: Jonas Ove Philip Eliasson, Copenhagen (DK); Jens Wagenblast Stubbe Østergaard, Lejre (DK)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 10/571,567

(22) PCT Filed: Sep. 9, 2004

(86) PCT No.: PCT/DK2004/000595

§ 371 (c)(1),
(2), (4) Date: Dec. 29, 2006

(87) PCT Pub. No.: WO2005/026938

PCT Pub. Date: Mar. 24, 2005

(65) Prior Publication Data

US 2007/0125937 A1    Jun. 7, 2007

(51) Int. Cl.
*G06F 3/033* (2006.01)
*G06F 3/042* (2006.01)
*G06K 11/00* (2006.01)

(52) U.S. Cl. .................. 250/221; 345/175; 345/176
(58) Field of Classification Search ............... 250/221, 250/222.1; 345/173, 175, 176; 178/18.09
See application file for complete search history.

(56) References Cited

U.S. PATENT DOCUMENTS

| 3,440,426 | A | 4/1969 | Bush |
|---|---|---|---|
| 4,254,407 | A | 3/1981 | Tipon |
| 4,346,376 | A | 8/1982 | Mallos |
| 4,484,179 | A | 11/1984 | Kasday |
| 4,550,250 | A | 10/1985 | Mueller et al. |
| 4,688,933 | A | 8/1987 | Lapeyre |
| 4,688,993 | A | 8/1987 | Ferris et al. |
| 4,692,809 | A | 9/1987 | Beining et al. |
| 4,710,760 | A | 12/1987 | Kasday |
| 4,772,763 | A | 9/1988 | Garwin et al. |
| 4,812,833 | A | 3/1989 | Shimauchi |
| 4,949,079 | A | 8/1990 | Loebner |
| 5,065,185 | A | 11/1991 | Powers et al. |
| 5,073,770 | A | 12/1991 | Lowbner |
| 5,159,322 | A | 10/1992 | Loebner |

(Continued)

FOREIGN PATENT DOCUMENTS

DE    3 511 330    10/1986

(Continued)

OTHER PUBLICATIONS

International Search Report (PCT/ISA/210).

(Continued)

*Primary Examiner*—John R Lee
(74) *Attorney, Agent, or Firm*—Harness, Dickey & Pierce, P.L.C.

(57) ABSTRACT

A method and system for determining the position of a radiation scattering/reflecting element, where the radiation emitter is provided at a surface of a radiation transmissive element an on which radiation is incident. This incident radiation is scattered/diffused/reflected by the scattering/reflecting element and guided by the transmissive element toward a detector able to determine the position of the element.

42 Claims, 8 Drawing Sheets

U.S. PATENT DOCUMENTS

| | | | |
|---|---|---|---|
| 5,166,668 A | 11/1992 | Aoyagi | |
| 5,227,622 A | 7/1993 | Suzuki | |
| 5,254,407 A | 10/1993 | Sergerie et al. | |
| 5,484,966 A | 1/1996 | Segen | |
| 5,499,098 A | 3/1996 | Ogawa | |
| 5,502,568 A | 3/1996 | Ogawa et al. | |
| 5,679,930 A | 10/1997 | Katsurahira | |
| 5,688,933 A | 11/1997 | Evans et al. | |
| 5,945,981 A | 8/1999 | Paull et al. | |
| 6,061,177 A | 5/2000 | Fujimoto | |
| 6,122,394 A | 9/2000 | Neukermans et al. | |
| 6,141,104 A | 10/2000 | Schulz et al. | |
| 6,172,667 B1 | 1/2001 | Sayag | |
| 6,333,735 B1 | 12/2001 | Anvekar | |
| 6,366,276 B1 | 4/2002 | Kunimatsu et al. | |
| 6,504,143 B2 | 1/2003 | Koops et al. | |
| 6,529,327 B1 | 3/2003 | Graindorge | |
| 6,538,644 B1 | 3/2003 | Muraoka | |
| 6,664,498 B2 | 12/2003 | Forsman et al. | |
| 6,707,027 B2 | 3/2004 | Liess et al. | |
| 6,738,051 B2 | 5/2004 | Boyd et al. | |
| 2001/0005004 A1 | 6/2001 | Shiratsuki et al. | |
| 2003/0048257 A1 | 3/2003 | Mattila | |
| 2003/0052257 A1 | 3/2003 | Sumriddetchkajorn | |
| 2003/0137494 A1 | 7/2003 | Tulbert | |
| 2004/0252091 A1 | 12/2004 | Ma et al. | |
| 2007/0034783 A1* | 2/2007 | Eliasson et al. | ............. 250/221 |

FOREIGN PATENT DOCUMENTS

| | | |
|---|---|---|
| DE | 689 02 419 | 3/1993 |
| DE | 690 00 920 | 6/1993 |
| DE | 198 09 934 | 9/1999 |
| DE | 100 26 201 | 12/2000 |
| EP | 0 298 837 A1 | 1/1989 |
| EP | 1 204 070 A1 | 5/2002 |
| EP | 1 209 554 A1 | 5/2002 |
| FR | 2 172 828 | 10/1973 |
| FR | 2 614 711 | 11/1988 |
| FR | 2 617 619 | 1/1989 |
| FR | 2 617 620 | 1/1989 |
| FR | 2 676 275 | 11/1992 |
| GB | 1380144 | 1/1975 |
| JP | 58-010232 | 1/1983 |
| JP | 59-202533 | 11/1984 |
| JP | 60 250423 | 12/1985 |
| JP | 61 133430 | 6/1986 |
| JP | 63 143862 | 6/1988 |
| JP | 63 187726 | 8/1988 |
| JP | 03-216719 | 9/1991 |
| JP | 03 216719 | 9/1991 |
| JP | 05095777 A2 | 4/1993 |
| JP | 07 036603 | 2/1995 |
| JP | 07-36603 | 2/1995 |
| JP | 08-075659 | 3/1996 |
| JP | 08-149515 | 6/1996 |
| JP | 09243882 | 9/1997 |
| JP | 11045144 | 2/1999 |
| JP | 11-232025 | 8/1999 |
| JP | 2000-259334 | 2/2000 |
| JP | 2000-172438 | 6/2000 |
| JP | 2000-293311 | 10/2000 |
| WO | WO 02/077915 | 10/2002 |
| WO | WO 02/095668 | 11/2002 |
| WO | WO 03/076870 | 9/2003 |

OTHER PUBLICATIONS

International Preliminary Exam Report (PCT/IPEA/416 and PCT/IPEA/409).

Joseph A. Paradiso, "Several Sensor Approaches that Retrofit Large Surfaces for Interactivity," ACM Ubicomp 2002 Workshop on Collaboration with Interactive Walls and Tables, Gothenburg, Sweden, Sep. 29, 2002.

* cited by examiner

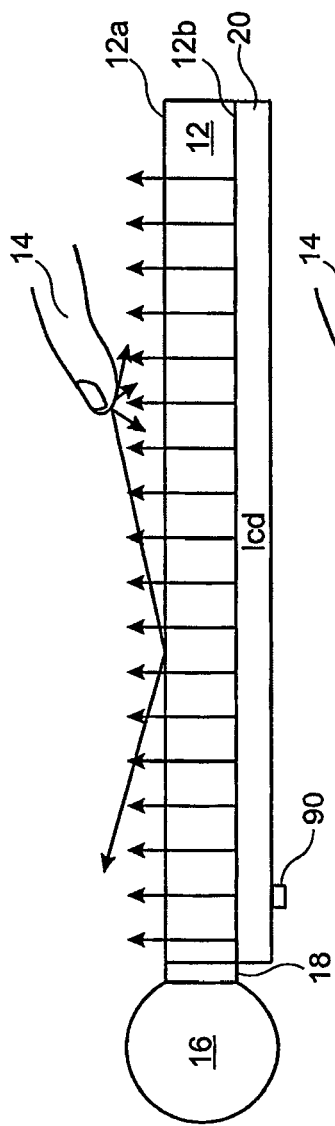
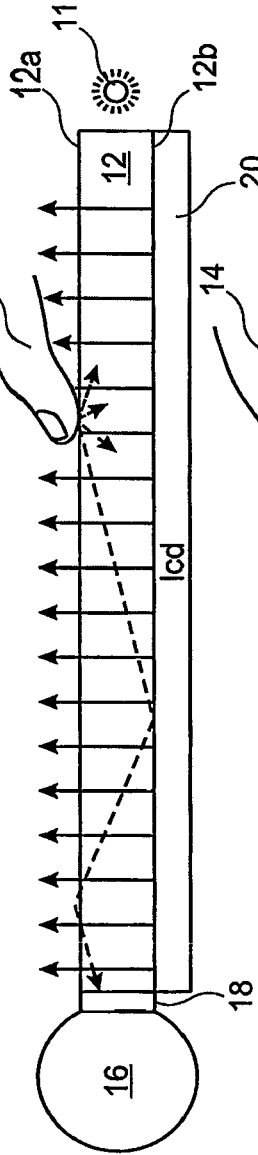
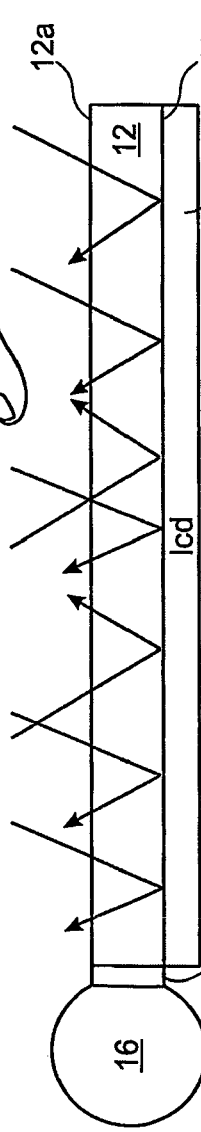
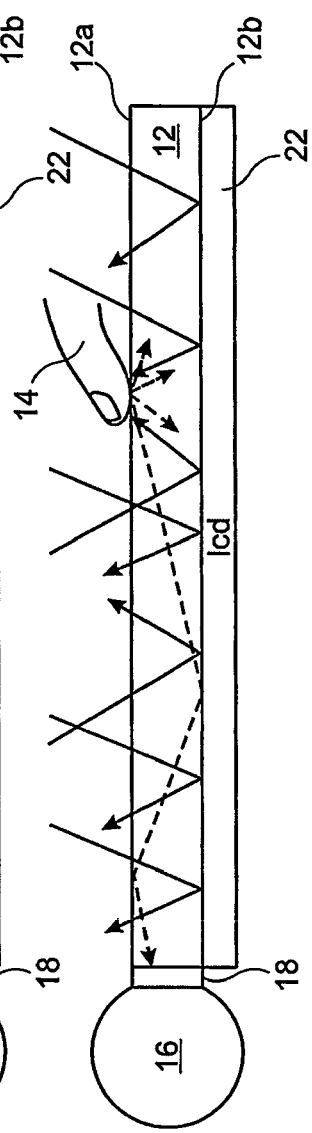

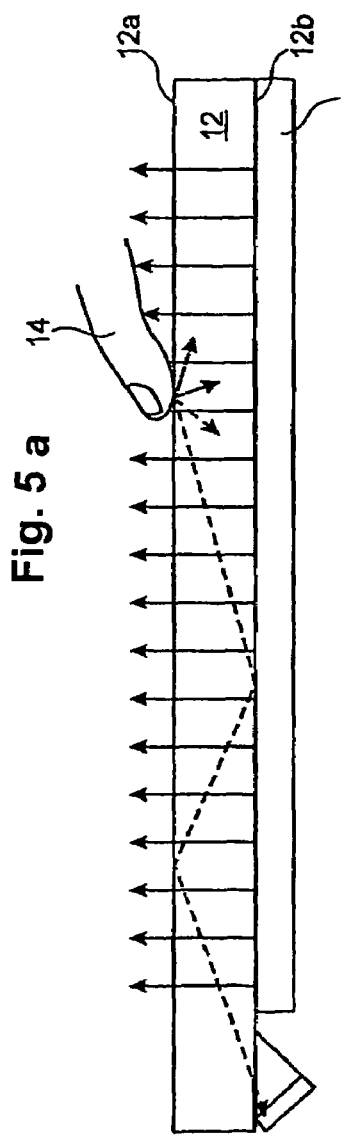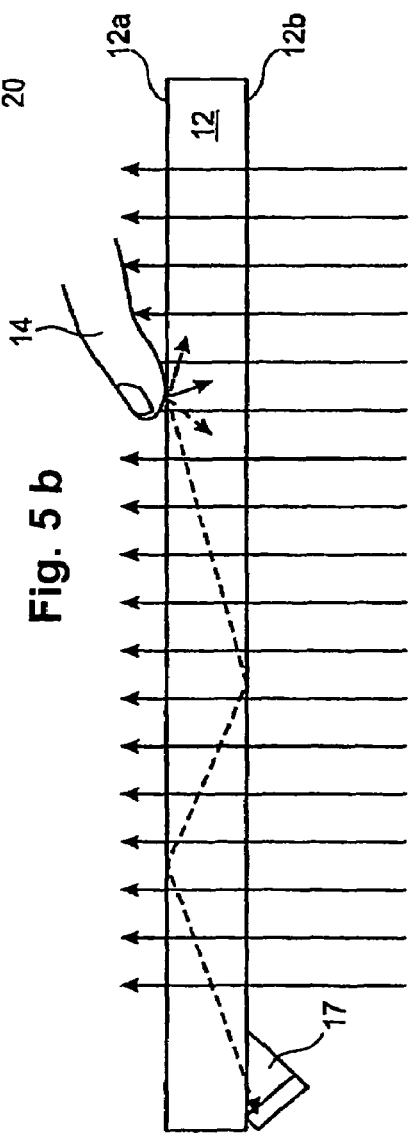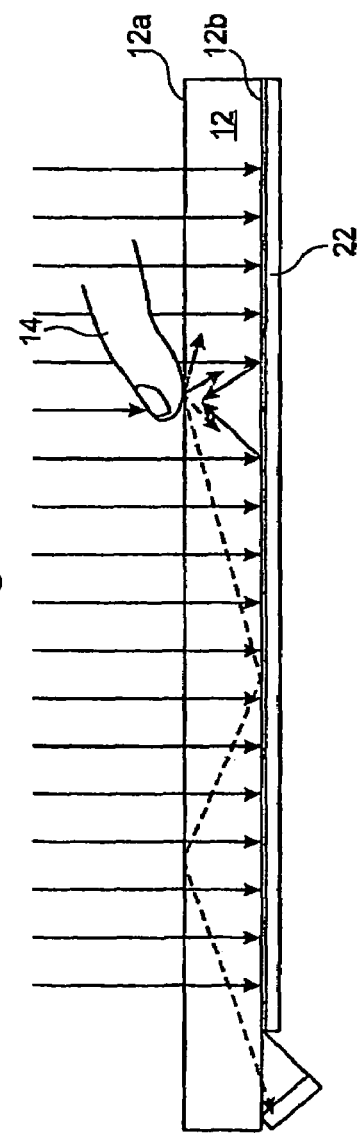

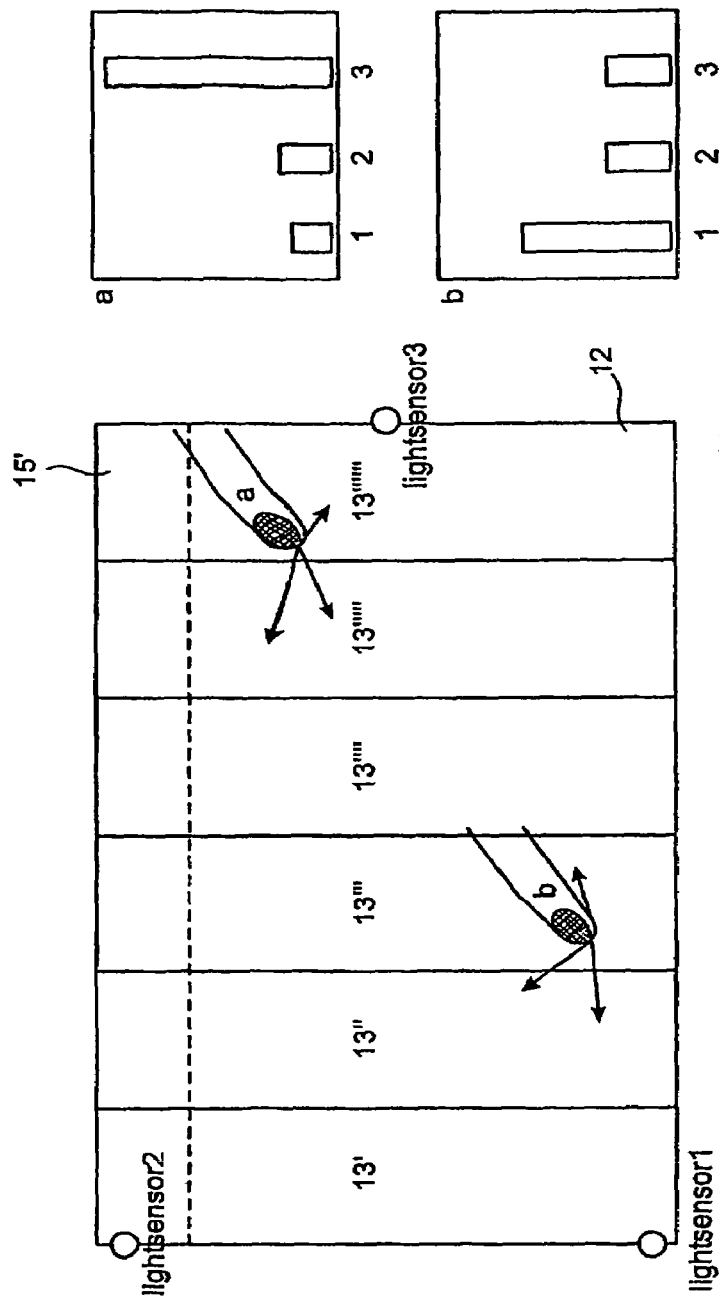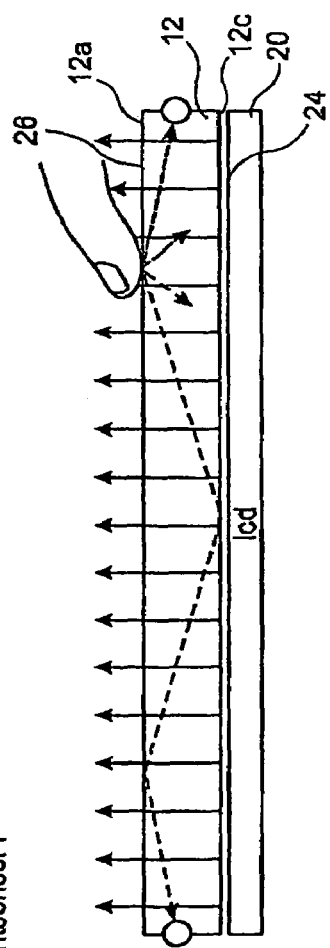
Fig. 6 a
Fig. 6 b
Fig. 6 c

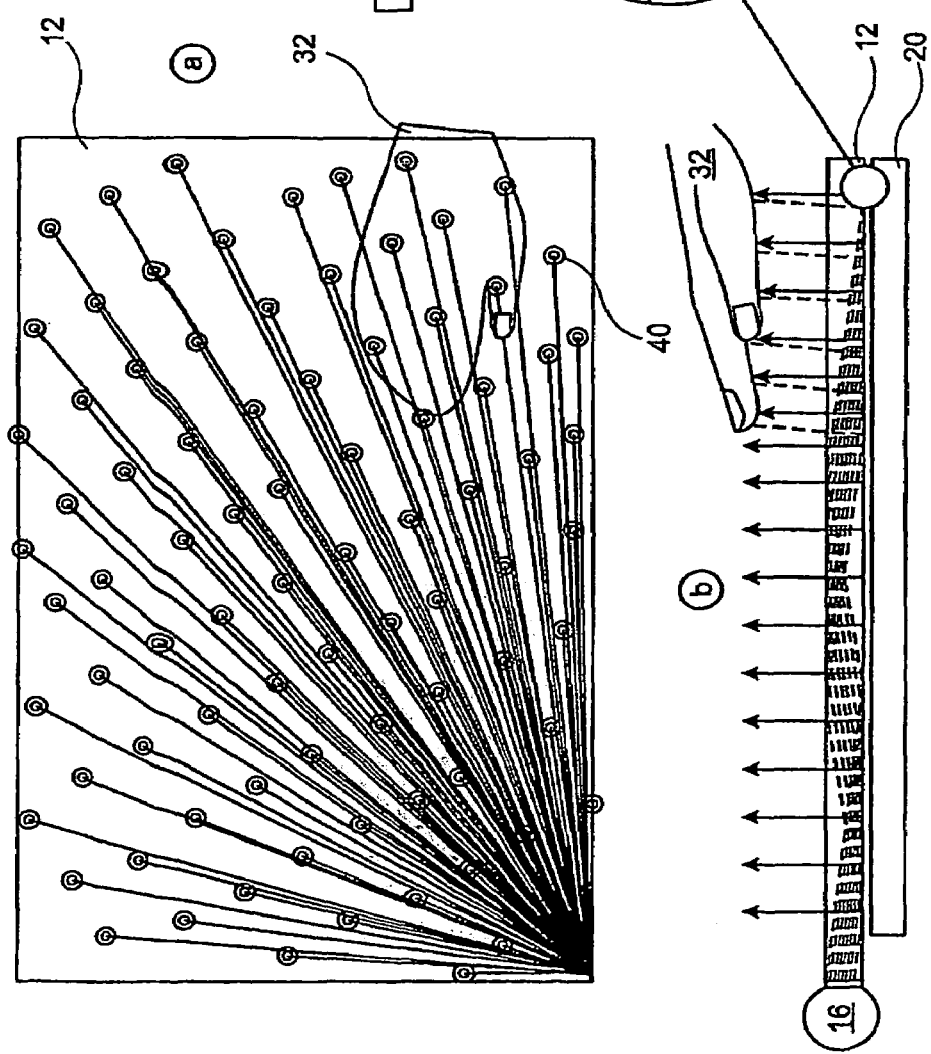
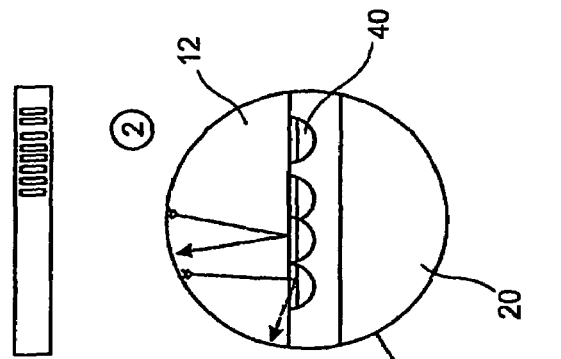
Fig. 7 a
Fig. 7 b
Fig. 7 c

US 7,465,914 B2

SYSTEM AND METHOD OF DETERMINING A POSITION OF A RADIATION SCATTERING/REFLECTING ELEMENT

FIELD OF THE INVENTION

Example embodiments relate to a system and a method of determining a position of a radiation scattering/reflecting/diffusing element and, in particular, to touch pads or the like.

BACKGROUND

A number of different technologies exist in the finger touch/touch pad area, but most of them have the drawback that the actual pad is vulnerable and easily breaks.

Touch pads in general are described in e.g. U.S. Pat. Nos. 4,346,376, 4,484,179, 4,688,933, 5,945,981, and 6,122,394, as well as U.S. Pat. Nos. 2003/0048257 and 2003/0052257.

SUMMARY

Example embodiments relate to a rugged, simple and cheap touch pad technology which may be used both with a number of different types of objects, such as fingers and inactive (simply reflecting or scattering incident radiation) objects.

In a first aspect, example embodiments relate to a system for determining the position of a radiation reflecting/scattering element, the system comprising:

a radiation transmissive element or plate having a first surface part adapted to be engaged by the reflecting/scattering member and a second surface part being opposite to the first surface part, the transmissive element being adapted to guide reflected/scattered light by internal reflection to the detecting means.

means for providing radiation into the transmissive element and onto the first surface part, means for detecting radiation provided by the radiation providing means and reflected/scattered by the reflecting/scattering element when engaging the first surface part at a position thereof and for outputting a signal relating to an angle of incidence of the radiation, the detecting means comprising at least one at least one-dimensional detector comprising a plurality of detecting elements each being adapted to detect radiation and to output a corresponding signal, the detecting means further comprising at least one aperture, pinhole, or lens adapted to modulate radiation incident on the detecting elements and means for determining, on the basis of angle signal, the position of engagement of the reflecting/scattering element on the first surface part.

In this context, "transmissive" will mean that a sufficient amount of the radiation is transmitted to permit a sensible measurement. A little absorption is not a problem depending on the extent of the transmissive element.

Normally, the transmissive element will be a generally flat element, but any shape, such as curved shapes, may be used.

The angle signal may be any signal describing the angle, such a digital signal or a voltage. Also, a number may describe an angle.

The angle of incidence will normally be relative to a pre-determined axis relating to e.g. the detector.

The transmissive element is adapted to guide the reflected/scattered light by internal reflection to the detecting means. Thus, the detecting means is preferably adapted to detect radiation having been transmitted by the transmissive element in a direction at least generally parallel with the first surface part.

The present manner of providing an angle sensitive detecting means is to have it comprise at least one at least one-dimensional detector comprising a plurality of detecting elements each being adapted to detect radiation and to output a corresponding signal, the detecting means further comprising at least one aperture, pinhole, or lens adapted to modulate radiation incident on the detecting elements.

In the present context, the modulation is a spatial modulation by which the intensity over the dimension of the detector is dependent on the position of the radiation scattering or reflecting.

In one embodiment, the radiation providing means comprise reflecting means for reflecting radiation penetrating the transmissive element from the first surface part to the second surface part back into the transmissive element. This may be e.g. ambient light or radiation from a radiation provider positioned so as to provide radiation toward the first surface part.

In another embodiment, the radiation providing means comprises a monitor or screen positioned at a second surface part of the transmissive element opposite to the first surface part and in a manner so as to emit radiation through the transmissive element on to the first surface part. Then, the monitor or screen could be adapted to provide radiation of different characteristics on to different areas of the first surface part. In this context, a characteristic is any characteristic, which radiation may have: wavelength, frequency, modulation, polarisation, intensity.

In this situation, in addition to the angle information, the information as to the characteristics detected may be used for determining the position of origin (diffusion etc) of the radiation.

Also, in this embodiment, the transmissive element preferably further comprises means for converting radiation from the monitor or screen, wherein the converting means are adapted to provide radiation of different characteristics on to different areas of the first surface part, and wherein the detecting means is adapted to also detect the different characteristics.

Thus, the radiation is normally guided without any significant reflection or diffusion inside the transmissive element. Reflection occurs at the edges of the transmissive element in order to guide the radiation toward the detector However, at the position where the scattering/diffusing/reflecting element touches the surface, the radiation will experience the diffusion/scattering/reflection and there be redirected from its original path.

In this connection, it is clear that the radiation will be guided in a direction of, normally, the first surface part, toward the detector. The radiation will, however, travel in directions at an angle to this surface part and be reflected by the surfaces of the transmissive element. The overall direction, however, is not affected by such reflections.

The transmissive element may have the shape of a plate or sheet and wherein the detecting means comprise a detector and a transferring means for engaging with the transmissive element so as to transfer radiation transmitted by the transmissive element to the detector. This is advantageous when e.g. the edges of the transmissive element are not accessible (which would be the case with e.g. existing shop windows). In that manner, the transferring means may actually be positioned not at an edge of the transmissive element but nevertheless extract part of the reflected/scattered radiation by contacting the transmissive element and thereby removing e.g. the internal reflection guidance at that position.

In one embodiment, the transmissive element comprises, at the first surface part thereof, means for converting radiation from the monitor or screen and reflected/scattered by the reflecting/scattering means, wherein the converting means are adapted to provide radiation of different characteristics from different areas of the first surface part, and where the detecting means is also adapted to detect the different characteristics. In this situation, the characteristics may not merely be those listed above but also spatial information, such as is provided by e.g. a bar code or other pattern. When this pattern is directed correctly, the angle sensitive detector may identify the pattern.

Also, this detecting means may comprise means for filtering radiation incident on the detecting elements. The resulting information may relate to wavelength, which may be used in the determination of the position. If the radiation reflected/scattered at different areas of the first surface part has different wavelengths depending on the distance to the detecting means, the angle will be detected by the detecting means, whereby the overall position may be determined.

An interesting embodiment is one further comprising second means, positioned at the second surface part, adapted to reflect or scatter radiation having a first wavelength and being incident thereon from the first surface part and from a first angle to the first surface part to a direction inside the transmissive element and having a second angle to the first surface part, the second angle being lower than the first angle.

In this manner, radiation entering the transmissive element at an angle where internal reflection is not possible may be re-directed to an angle where the light is, in fact, guided.

In this manner, light reflected/scattered by an element not even touching the first surface part may be collected and guided by the transmissive element.

In one situation, the second reflecting/scattering means are provided in predetermined areas over the second surface area. Then, in order to be able to relate solely on an angle detection, the detecting means and the predetermined areas may be provided at positions so that, from each of a number of the predetermined areas, no other predetermined area exists along a straight line between the predetermined area and the detecting means.

In order to be able to also be operable in a mode where the reflecting/scattering element must touch the first surface part, the second reflecting/scattering means may also be adapted to reflect radiation having a second wavelength, being different from the first wavelength, and having a third angle to the first surface part, back toward the first surface part at an angle being at least substantially equal to the third angle.

Another interesting embodiment is one comprising second means for providing the radiation to a predetermined area of the first surface part, the second providing means being adapted to prevent radiation onto areas adjacent to the predetermined area.

The second providing means could comprise a radiation blocking (absorbing, reflecting in a direction where the light does not interfere or the like) area at or on adjacent areas of the first surface part.

When the predetermined area is oblong, such having a length of ½-20 cm, such as 1-5 cm, preferably 1½-3 cm, this embodiment may be used for e.g. obtaining a finger print of a person. The finger is moved (while touching) across the slot (which is preferably directed at an angle to a direction from the slot to the detector), whereby the angle sensitive detector will detect the difference in radiation scattering/reflection from the ridges and valleys of the finger.

In a preferred embodiment, the system further comprises:

one or more radiation emitters adapted to transmit electromagnetic radiation into the radiation transmissive element and toward the first surface thereof and means for preventing radiation from travelling directly from the emitters to the detector.

In this context, the direct path from the emitter to the detector is one along the overall direction of the radiation independently of the reflections thereof at the surfaces of the transmissive element and any reflectors.

In this manner, radiation may be emitted in a direction toward the detector, but this radiation is prevented from reaching the detector in order not to "blind" the detector.

Preferably, the radiation emitters is/are provided at positions opposite to the detector, which may mean at sides of the radiation transmissive element at which the detector is not positioned (such as at positions in a field of view of the detector). In that manner, the radiation intensity scattered by the reflecting/scattering element is the highest the farthest away from the detector, where the largest intensity loss is experienced between this position and the detector. The closer the reflection/scattering occurs to the detector, the lower the radiation loss between the detector and the reflection/scattering, but the higher the intensity loss between the radiation emitter and the reflection/scattering position. Consequently, overall a higher sensitivity is obtained at the positions the farthest away from the detector.

In another preferred embodiment, the system further comprises a force sensing means for sensing a force with which the reflecting/scattering element pushes the radiation transmissive element.

This force detection may be used for bringing the system out of a sleep mode (power saving mode where any light emitters are turned of or down as may the detector and part of the electronics be) or simply in order to provide a second indication of a depression (intended reflection/scattering) of the scattering means toward the first surface. Thus, reflections/scattering may be ignored (as being uninteresting), when the force sensor senses no or a too small force.

The radiation transmissive element may have, at least at the first surface part, no other manner of transporting the radiation toward the detector than its surface and the reflection provided by the difference in refractive index between that of the transmissive element and (normally) air. In that manner, even though a reflector may be present at the second surface part, the transmission of the radiation inside the transmissive element is performed by total internal reflection of the radiation. This operation, however, brings about requirements as to the angles which the radiation must have to the first surface and thereby the ability of the system to especially detect a scattering/reflecting element not touching the first surface part or having only a faint reflection/scattering of the light at the first surface part.

Another embodiment relates to manner of increasing the range of angles which may be transported in the transmissive element. This embodiment is one comprising a reflector at the second surface part and further comprising a reflective element extending in a direction of the first surface part, and having a plurality of predetermined areas, the reflective element being adapted to, in the areas, provide radiation transmission from the first surface part toward the second surface part and, outside the areas, provide reflection of radiation travelling from the second surface part toward the first surface part back toward the second surface part.

These areas may simply be openings or holes in the reflective element. Alternatively, lenses or the like may be used.

The reflective element may be positioned on or at the first surface part or inside the transmissive element.

Now, radiation that enters the transmissive element and penetrates the reflective element at an area thereof will enter a "channel" between the reflective element and the reflector at the second surface part. Radiation may be able to escape this channel via another area, but a large part of the radiation may be transported by the reflectors toward the detector. Thus, as the transport need now not be bound by the angle requirements of total internal reflection, steeper angles may be supported.

Thus, radiation from an element not touching the first surface part may enter the transmissive element and enter the "channel" via an area and thereafter be transported to the detector.

Also, radiation from a scattering/reflective element may enter the "channel" via a number of areas, and the detecting means and/or the determining means will be able to determine the position of the areas and there from that of the scattering/reflecting element.

A second aspect of the invention relates to a method for determining the position of a radiation reflecting/scattering element, the method comprising:
  providing radiation into a transmissive element or plate and onto a first surface part thereof, the radiation transmissive element also having a second surface part being opposite to the first surface part,
  providing engagement between the reflecting/scattering member and the first surface part of the radiation transmissive member,
  guiding the reflected/scattered light by internal reflection in the radiation transmissive member to the detecting means,
  modulating radiation incident on the detecting means with at least one aperture, pinhole, or lens,
  detecting radiation, using an at least one-dimensional detector comprising a plurality of detecting elements each detecting radiation and outputting a corresponding signal, provided by the radiation providing means, reflected/scattered by the reflecting/scattering element engaging the first surface part at a position thereof, and being modulated by the at least one aperture, pinhole, or lens, and providing a signal relating to an angle of incidence of the radiation, and
  determining, on the basis of the angle signal, the position of engagement of the reflecting/scattering element on the first surface part.

This engagement preferably is obtained by having the reflecting/scattering member touch the surface part at at least one area.

In one embodiment, the radiation providing step comprises reflecting radiation penetrating the transmissive element from the first surface part to the second surface part back into the transmissive element.

In another embodiment, the radiation providing step comprises providing the radiation from a monitor or screen positioned at a second surface part of the transmissive element opposite to the first surface part and in a manner so that radiation is emitted through the transmissive element on to the first surface part. Then, the monitor or screen may provide radiation of different characteristics on to different areas of the first surface part. Also, the radiation providing step could comprise converting radiation from the monitor or screen, wherein the converting step comprises providing radiation of different characteristics on to different areas of the first surface part, and wherein the detecting step comprises also detecting the different characteristics.

Also, preferably, the transmissive element has the shape of a plate or sheet, and wherein the detecting step comprises transferring radiation transmitted by the transmissive element to a detector. Again, this provides a setup where access to the edges of the transmissive element is not required if the transferring is provided by engaging the transmissive element and a second transmissive element and thereby receiving the scattered/reflected radiation in the second transmissive element, where the radiation is detected.

In one embodiment, the method may further comprise the step of converting, at the first surface part, radiation from the monitor or screen and reflected/scattered by the reflecting/scattering means, wherein the converting step comprises providing radiation of different characteristics from different areas of the first surface part, and where the detecting step also comprises detecting the different characteristics.

A manner of providing information, in addition to the modulation of the radiation incident on the detector, is to have the detecting step comprise filtering radiation incident on the detecting elements.

Another embodiment further comprises a second step of reflecting or scattering, at the second surface part, radiation having a first wavelength and being incident thereon from the first surface part and from a first angle to the first surface part to a direction inside the transmissive element and having a second angle to the first surface part, the second angle being lower than the first angle.

Then, the second reflecting/scattering step may be performed in predetermined areas over the second surface area. Further, this embodiment may then comprise positioning the detecting means and the predetermined areas at positions so that, from each of a number of the predetermined areas, no other predetermined area exists along a straight line between the predetermined area and the detecting means.

Also, the second reflecting/scattering step may comprise reflecting radiation having a second wavelength being different from the first wavelength and having a third angle to the first surface part, back toward the first surface part at an angle being at least substantially equal to the third angle.

In yet another embodiment, the providing step comprises providing the radiation to a predetermined area of the first surface part, the second providing step comprises preventing radiation onto areas adjacent to the predetermined area. This second providing step could comprise preventing or blocking radiation at or on adjacent areas of the first surface part.

Then, the providing step could comprise providing the radiation to an oblong area, such as an area having a length of ½-20 cm, such as 1-5 cm, preferably 1½-3 cm in order for it to be adapted to the width of a finger.

In a preferred embodiment, the method further comprises the steps of:
  one or more radiation emitters transmitting electromagnetic radiation into the radiation transmissive element and toward the first surface thereof and
  preventing radiation from travelling directly from the emitters to the detector.

In another preferred embodiment, the method further comprises the step of sensing a force with which the reflecting/scattering element pushes the radiation transmissive element.

As described above, the radiation travelling in the transmissive element may be transported by total internal reflection, such as when the radiation has an angle, to the first surface, below that required by the refractive index difference between the refractive index of the transmissive element and, normally, air.

Another embodiment further comprises the steps of: providing a reflective element extending in a direction of the first surface part, and having a plurality of predetermined areas, the reflective element:

facilitating radiation transmission, in the areas, from the first surface part toward the second surface part and reflecting, outside the areas, radiation travelling from the second surface part toward the first surface part back toward the second surface part.

Thus, a larger angle interval may be transported in the transmissive element.

A third aspect of the invention relates to a system for determining the position of a radiation emitting/reflecting/scattering element, the system comprising:

a radiation transmissive element or plate having a first surface part and a second surface part being opposite to the first surface part, a first reflective element extending in a direction of the first surface part, and having one or more predetermined areas, the reflective element being adapted to, in each area, provide radiation transmission from the first surface part toward the second surface part and, outside the area(s), reflect radiation travelling from the second surface part toward the first surface part back toward the second surface part, a second reflective element extending in a direction of the first surface and being adapted to reflect radiation travelling in the transmissive element from the first reflective element toward the second surface part back toward the first surface part and the first reflective element, a detecting means comprising at least one at least one-dimensional detector comprising a plurality of detecting elements each being adapted to detect radiation and to output a corresponding signal, the detecting means further comprising at least one aperture, pinhole, or lens adapted to modulate radiation incident on the detecting elements, the detecting means being adapted to:

detect radiation from the emitting/reflecting/scattering means, which radiation has entered the transmissive element, passed through an area of the first reflective element and has been reflected toward the detector by the first and/or second reflective element and output a signal relating to an angle of incidence of the radiation, and means for determining, on the basis of the angle signal, a position of the emitting/reflecting/scattering element in relation to the first surface part.

Consequently, radiation emitted from or scattered/reflected by the emitting/scattering/reflecting element may enter the transmissive element and the space therein between the first and the second reflective element via an area of the first element, where after it is transported toward the detector by the two reflecting means.

The first reflective element may be provided at the first surface part of the transmissive element, whereby a positioning of the emitting/scattering/reflecting element on this surface will bring about detection of that position as that or those position(s) (depending on the spacing between the areas and the extent of the emitting/scattering/reflecting element) from which radiation penetrates the first reflecting element via an area thereof.

The first reflective element may also be provided inside the transmissive element and away from the first surface, where after a slightly more complicated transport pattern of the radiation is provided. This, however, also brings about the determination of the position of the emitting/scattering/reflecting element on the basis of the positions of the areas in which the radiation from the emitting/scattering/reflecting element penetrates the first reflective element (e.g. the first time, if multiple penetrations occur).

If the emitting/scattering/reflecting element does not touch the first surface part or if a relatively large distance exists between the first surface part and the first reflective element, other effects also take place, such as a minimum angle at which radiation enters the transmissive member and an overall intensity change depending on the overall distance from the actual area to the detector and the number of reflections the radiation takes when travelling from the area to the detector.

In a preferred embodiment, the system further comprises means for providing radiation toward the emitting/reflecting/scattering element and preferably outside the transmissive element in order to facilitate a better detection of a scattering/reflecting element not touching the first surface part.

A fourth aspect of the invention relates to a method of determining the position of a radiation emitting/reflecting/scattering element, the method comprising:

providing a radiation transmissive element or plate having a first surface part and a second surface part being opposite to the first surface part, providing a first reflective element extending in a direction of the first surface part, and having a plurality of predetermined areas, providing a second reflective element extending in a direction of the first surface part, providing a detecting means comprising at least one at least one-dimensional detector comprising a plurality of detecting elements each being adapted to detect radiation and to output a corresponding signal, receiving radiation from the emitting/reflecting/scattering element into the transmissive element, through an area, and toward the second reflective element, the first and second reflective elements subsequently reflecting at least part of the received radiation toward the detecting means, modulating radiation incident on the detecting elements with at least one aperture, pinhole, or lens, detecting modulated radiation and outputting a signal relating to an angle of incidence of the radiation, and determining, on the basis of the angle signal, a position of the emitting/reflecting/scattering element in relation to the first surface part.

Then, the method preferably further comprises providing radiation toward the emitting/reflecting/scattering element especially outside the transmissive means.

BRIEF DESCRIPTION OF THE DRAWINGS

In the following, example embodiments of the invention will be described with reference to the drawing, wherein:

FIG. 1 is a side view of a first embodiment of the system where a finger, scattering radiation, is lifted from a touch pad surface, FIG. 2 is a side view of the first embodiment of the system where a finger, scattering radiation, engages the touch pad surface, FIG. 3 is a side view of a second embodiment of the system where a finger, scattering radiation, is lifted from a touch pad surface, FIG. 4 is a side view of the second embodiment of the system where a finger, scattering radiation, engages the touch pad surface, FIG. 5a-c illustrate three alternatives of a third embodiment of the system, FIG. 6a-c illustrate a fourth embodiment of the system using a colour coding of the light, FIG. 7a-c illustrate a fifth embodiment of the system.

DETAILED DESCRIPTION OF EXAMPLE EMBODIMENTS

Figure 8:
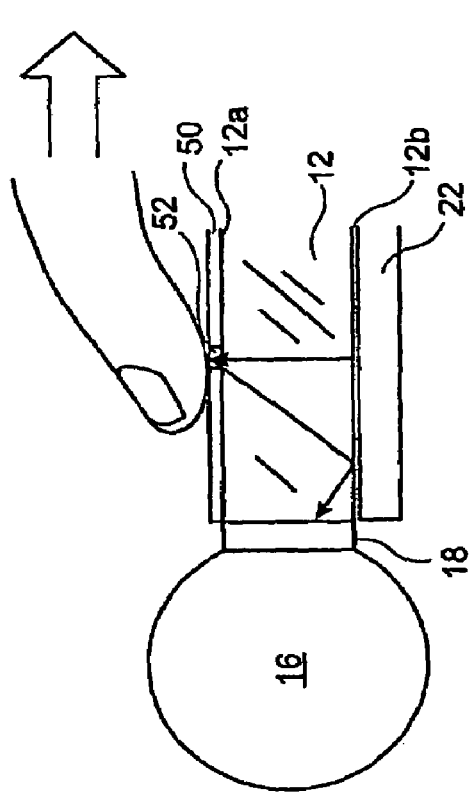
FIG. 8a-d illustrates a sixth embodiment of the system.
Figure 8:
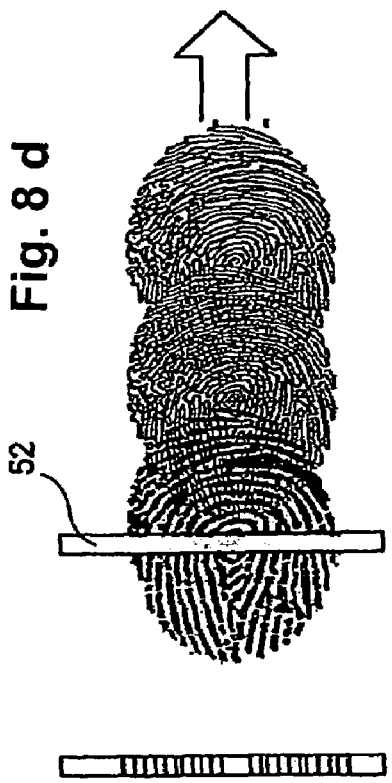
Figure 8:
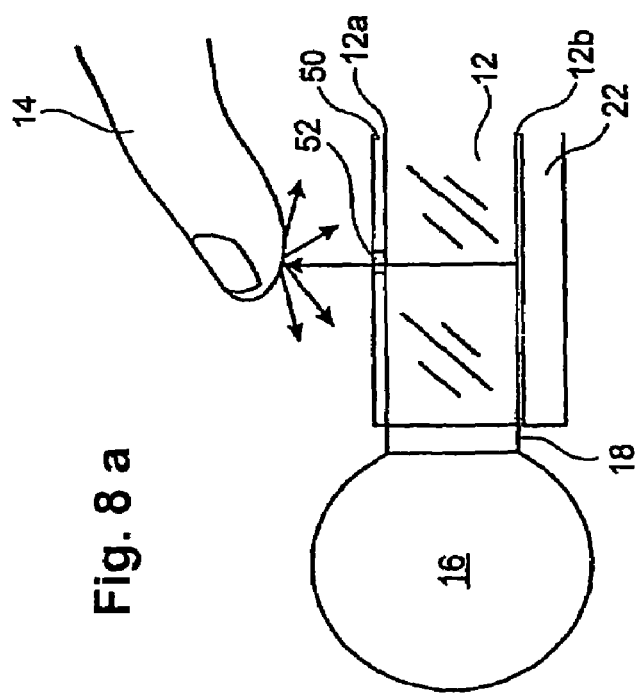
Figure 8:
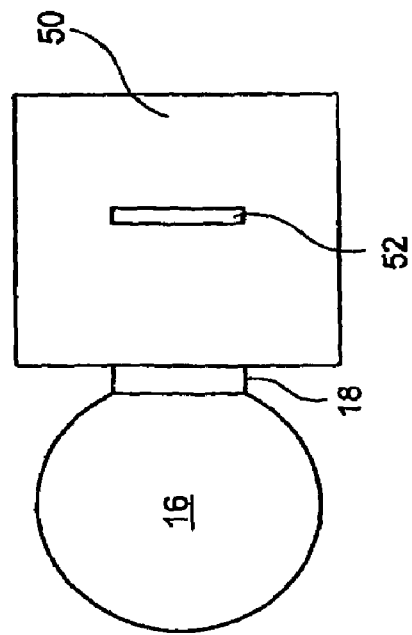

The overall function of the invention is illustrated in FIGS. 1-4 where a light transmissive element in the form of a plate 12 has a surface 12a which is adapted to be engaged by a reflecting/scattering element, here in the form of a finger 14. Visible light, which is used in the present embodiments but which may be replaced by any electromagnetic radiation, is transferred into the plate 12 and is reflected/scattered by the finger at the position at the surface 12a where the finger touches the surface. At the other positions of the surface 12a, the light will either exit the plate 12 or be reflected back there into toward the opposite surface 12b of the plate 12.

The light reflected/scattered by the finger 14 is reflected in a number of directions, and part of the reflected/scattered light will subsequently be guided by the plate 12.

A detector 16 is positioned so as to be able to receive the light guided by the plate 12. In the present embodiments, the detector 16 is positioned at an edge portion of the plate 12 so as to directly receive light travelling in the plate 12.

From FIGS. 1 and 3, it is seen that no light is reflected/scattered by the finger 14 and back into the plate 12 in a manner so that it is guided by the plate 12, when the finger 14 does not touch the plate 12. The reason for this is that the light reflected in the angular interval in which the light would, in fact, be guided in the plate 12 will reflect off the surface of the plate due to it being generated or reflected/scattered outside the plate 12.

The difference between FIGS. 1/2 and FIGS. 3/4 is the manner in which the light incident on the finger 14 actually enters the plate 12. In FIGS. 1/2, the light is provided by a screen or monitor, such as a LCD or a CRT, 20 which is positioned so as to emit light toward the surface 12b and into the plate 12, in FIGS. 3/4, the light (such as ambient light) actually is received from outside the plate 12, through the surface 12a, is transmitted through the plate 12, is output there from through the surface 12b and is reflected, by a reflector 22, back into the plate 12 and e.g. toward the finger 14.

A third manner of providing the light is to provide the light into the plate 12 from a position 11 similar to that of the detector 16—that is, to actually guide also that light inside the plate 12 toward the finger 14. In that situation, it may be desired to ensure that this (non-reflected/scattered) light is not able to reach the detector 16. Alternatively, the detector 16 or the electronics controlling it may be adapted to not take that light into account in the calculation.

The detector is adapted to detect the position of the finger 14. A number of manners exist of obtaining that task is to provide an at least one-dimensional detector (such as a line CCD) provided with an aperture or lens 18 between the detector and the plate 12. This aperture or lens 18 provides the detector with an angle sensitivity in that light incident from different angles will be detected at different positions on the detector.

As is described in the applicants co-pending applications filed on even date and titled "A system and a method of determining the/a position of a radiation emitting element", a single line detector or a bar code may be used for determining the position when combined with a reflector positioned e.g. along a side of the plate 12.

As described in the applicants co-pending application PCT/DK03/00155, an alternative is the use of two detections of radiation from the emitter, which angles may be provided by e.g. a direct measurement and one or more reflectors and on the basis of which the position may be determined using triangulation.

FIG. 5 illustrates another embodiment in which three manners of providing the light into the plate 12 and toward the finger are illustrated: a) from an LCD as in FIGS. 1/2, b) from another source (such as ambient light) outside the surface 12b, and c) from a mirror or reflector 22 as in FIGS. 3/4.

FIG. 5 illustrates a different detector positioning in that the detector 16 is now positioned at a position "under" the plate 12, that is, in an area covered by a projection at a right angle to the surface 12a. The detector 16 receives light from the plate 12 via a connection element 17 adapted to extract light from the plate 12 and guide it to the detector 16. The element 17 receives the light from the plate 12 in that it removes the index difference at the surfaces of the plate.

The operation of the detector 16 etc. is the same as for FIGS. 1-4.

The set-up of FIG. 5 is suitable for use in e.g. windows or other existing transparent plates, where a simple adding of the detector 16 and the connector element 17 may turn a window, such as a shopping window, into an over-size touch pad. A poster or other pre-printed matter may be positioned behind the window in order to e.g. predefine areas where the user may operate the touch screen.

An alternative to the detection schemes of FIGS. 1-5 is seen in FIG. 6, wherein the light incident to the surface 12a has different colours in different areas 13'-13'''' thereof. Instead of different colours, the light may be provided with other differing characteristics, such as modulation frequencies (intensity, wavelength variation or the like).

These characteristics may be provided by having an underlying LCD 20 output light with the desired characteristics in the desired areas. Alternatively, a filter 24 may be provided between the LCD 20 and the plate 12 in order for it to provide the desired characteristics from e.g. white light or light allowing this providing of the characteristics and output from the LCD. Naturally, the light provided in this manner may also be e.g. ambient light provided toward and through the surface 12b.

In this connection, it should be noted that e.g. a band pass filtering only makes sense, if the light provided to the filter comprises wavelengths in the filtering band. On the other hand, if the characteristics are different modulation frequencies, any wavelength may be used.

Yet another manner of providing these characteristics is to provide, at the surface 12a, means, such as a filter or modulator, for providing the characteristics at this position. In this situation, it should be remembered that the light obtaining these characteristics will penetrate these means at an angle different from a right angle. In this manner, the light incident on the finger 14 may be provided by any of the above-mentioned manners.

These characteristics may be provided in predetermined areas, such as in rectangular areas, and multiple types of characteristics may be provided, so that a first type of characteristic (such as different colours) may be provided in a first pattern on the surface 12a, and another characteristic (such as frequency modulation or different frequencies) may be provided in another pattern (illustrated by area 15') on the surface. In this manner, light with a given e.g. colour may only be determined to stem from a given area having a given extension. This area may be further narrowed (a better position determination) if only part of that area has the other characteristic measured (such as a given frequency).

In FIG. 6a, a total of six different colours are provided in adjacent areas (13'-13"""') covering the surface 12a. Any number of colours may be selected. In addition, a number of "frequency modulation" areas overlapping the six colouring areas but extending e.g. in a direction perpendicular (area 15') to the colour areas may be provided in order to narrow the individual areas on the surface 12a having both the sane colour and the same frequency.

In principle, any of the above detection strategies may be used with the present colouring, with the addition that the detector should now be colour sensitive. This sensitivity may be provided by providing the detector with a number of lines of detector elements, each line having a filter selecting one of the colours.

In fact, another detection strategy may be used, i.e. a single line of detector elements with an aperture/pinhole/lens fitted in front. This detector is sensitive to the angle of the incident light (due to the aperture/pinhole/lens), whereby the angle of the incident light is detectable. From the colour of the light, the distance may be determined, whereby a coarse (depending on the distribution of colours) position determination may be made.

In this situation, the colour variation preferably occurs in the direction toward the detector in order to obtain the best detection principle.

The colours may be provided in a number of manners:
an underlying monitor/screen 20 may itself provide the coloured light,
an underlying monitor/screen 20 may provide e.g. white light and a filter 24 positioned between the monitor/screen 20 and the plate 12 may provide the colour, and
a filter 26 may be provided on the surface 12a so that the light reflected from the finger/stylus 14 is coloured by the filter 26.

Naturally, instead of filters, modulators may be used.

A third manner of providing an area specific signal would be to use a spatial coding, such as is known from bar codes, by:
providing the light from the screen 20 in that manner,
providing a coding member between the screen 20 and the plate 12, or
providing a coding member at or on the surface 12a.

In this manner, the light directed by the finger/stylus 14 toward the detector 16 will be spatially coded in a manner which may be detected by the detector 16. The easiest manner of doing this is to have the spatial coding (such as a bar code pattern) performed in a direction perpendicular to the direction from the actual position to the detector 16. Thus, this pattern may be detected and in itself provide the position. In other situations, the pattern may be used for identifying a direction or a distance from the detector 16.

This coding may also be provided only at predetermined points so as to e.g. take the shape of operatable buttons having a predetermined function which the controlling means perform upon detection of operation of the button.

FIG. 7 illustrates an interesting embodiment wherein a touch pad is combined with an instrument actually able to detect and determine waving or gesturing of e.g. an operator above the surface 12a without actually touching that surface. This has a number of uses, such as during surgery, where the surgeon is not supposed to unnecessarily touch surfaces due to the risk of contamination.

In FIG. 7, again the LCD 20 illuminates the plate 12. In this embodiment, a number of reflecting/scattering elements 40 are provided between the LCD 20 and the surface 12b. These elements 40 are adapted to direct radiation incident thereon from the plate 12 toward the detector 16 under an angle low enough to ensure that the reflected radiation is guided by the plate 12.

This incident radiation may stem from radiation emitted by the LCD 20 and which traverses the plate 12 and is reflected/scattered by e.g. a hand 32 positioned above the surface 12a but not touching it. Part of this reflected/scattered radiation will be reflected off the surface 12a and disappear and another part will traverse the plate 12 and be reflected by the elements 40.

It is clear that due to the interaction of the surface 12a, only radiation relatively vertical will reach the elements 40.

In this embodiment, the elements 40 (see FIG. 8a) are positioned so that the direct line from each element 40 to the detector does not encounter or pass any other element 40. In this manner, a simple angle measurement of the detector 16 will fully determine the position of the element 40 and thereby the hand 32. Alternatively, a position sensitive detector may be used, whereby any positions may be selected for the elements 40.

In this embodiment, the plate 12 may also be used as a normal touch pad as described in relation to FIGS. 1-4. The LCD 22 may provide also another wavelength different from that used for detecting the hand. When this wavelength is scattered by a finger 14 touching the surface 12a, the elements 40 may be adapted to simply reflect (input angle and output angle being identical) that wavelength (see FIG. 8c), whereby the operation will be as that described in relation to FIGS. 1-4.

FIG. 8 illustrates an embodiment wherein the present touch pad may be used for providing information relating to the actual radiation provider, such as a finger print of a finger.

In this embodiment, the plate 12 is provided, at the surface 12a, with a cover/absorber 50 ensuring that the light from the LCD 22 is only provided to/from the surface 12a in a slot 52 defined therein.

In that manner, a resolution is obtained in the radial direction away from the detector 16, which may be the single line of detecting elements with an aperture/lens 18.

Moving the finger 14 over the slot 52 will provide different reflection/scattering from the actual "hills" of the finger compared to the "valleys" thereof for any given position. This movement and this difference may be detected, whereby a finger print as that illustrated may be generated.

An alternative to the slot 52 would be a small ridge on the surface 12a which ensures sufficient engagement between the plate 12 and the finger 14 and reduces the engagement (interference) of adjacent parts of the finger on the plate 12.

This finger print monitor may be provided as part of any of the touch pads of the other drawings, whereby the pads described (such as for use in PDA's or mobile telephones, computers and the like) may be rendered functional (logged on to) by only the authorised user of the like.

The detector may be a single chip having the one or more rows of detectors or may be prepared by combining a number of individual detectors.

The determining means may be any type of processor, such as software programmable, hardwired, a PC, or a mainframe, and it may use any known type of storage (RAM, ROM, PROM, EPROM, EEPROM, hard disc, floppy disc, optical storage media, or tape) and it may be connected to other processors (such as via the internet or via wireless connections) in order to have calculations or the like performed at other sites.

Naturally, the determining means may be used for other purposes, such as for illustrating on a monitor or screen, such as one underlying the positions where the radiation emitter is, the signs, curves, characters drawn with the emitter or icons, desk tops or the like pointed at (selected, e.g.) by the emitter (where the emitter may be adapted to be turned on and off by the operator so that a light "blip" from the emitter may signal to the processor that a predetermined action relating to this particular position should be activated). Thus, the determining means may be used for tracking the positions in order to draw curves or in order to, for each new position determined, to evaluate the correctness of the position in relation to the curve drawn (so as to discard obviously erroneous positions).

Figure 9:
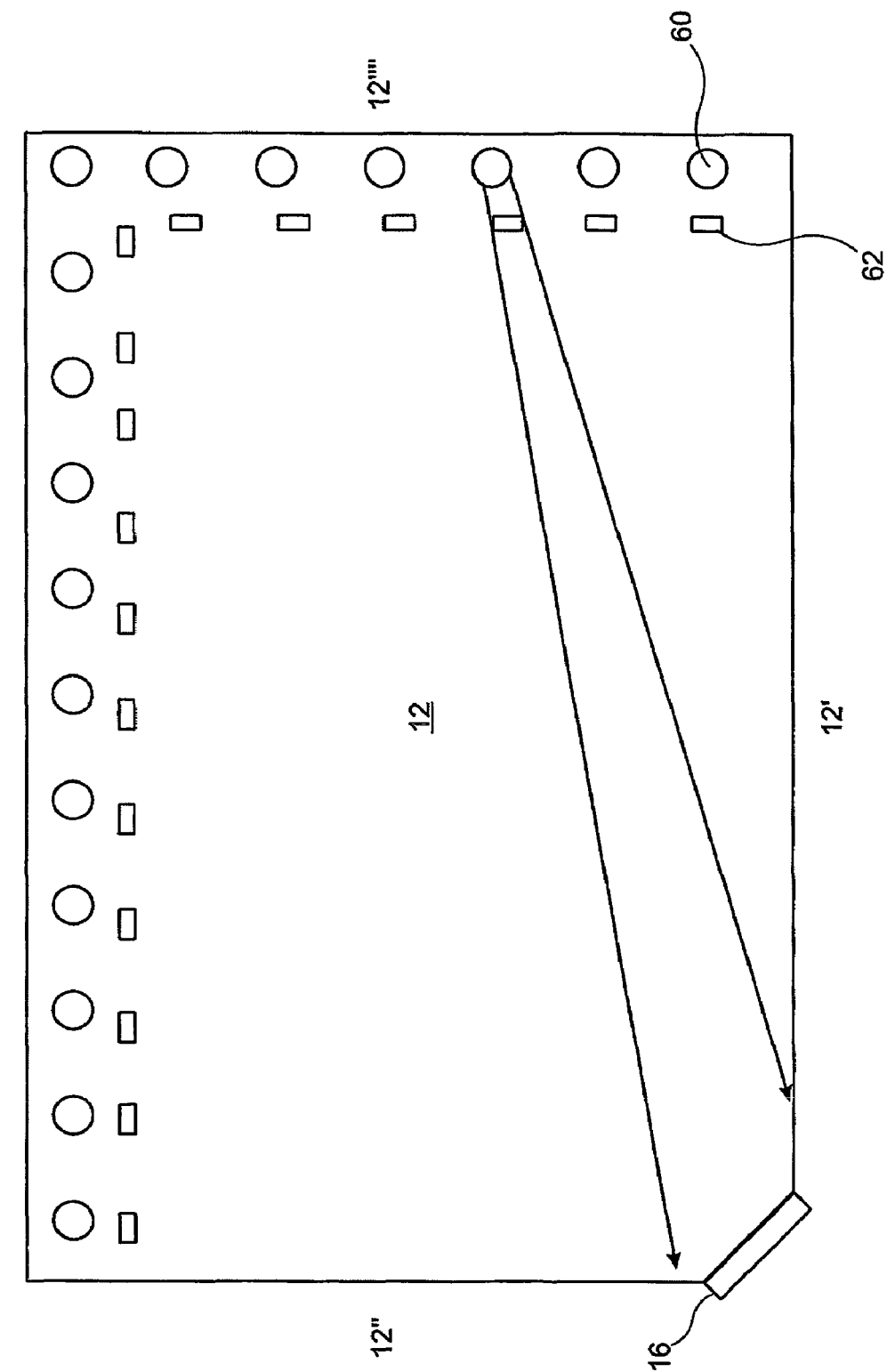
FIG. 9 illustrates a positioning of light providers.

In FIG. 9, a light transmissive means 12 has four sides 12' 12" 12''' 12'''' and a number of light coupling points 60 with blinders 62 that are absorbing, refracting or reflecting radiation in order to prevent light from directly reaching the sensor 16. Then, the radiation actually entering the sensor 16 is modulated by light scattering/diffusive objects, such as the finger 14 in FIG. 1. The means 12 has two sides 12' and 12" adjacent to the sensor 16 that has upper and/or under surfaces which are not in the field of view of the sensor 16. These sides may be used for entering additional radiation, such as ambient light entering through a sand blasted side or a side covered by microstructures, holographic film with microstructures, or paint so any light that enters the light transmissive means 12 will not enter the sensor directly.

The blinders 62 may be microstructures that absorb or refract non TIR reflection in order to minimise unwanted reflections entering the sensor.

The light coupling points can accept ambient light, screen light, screen backlight or active light sources. With the exception of ambient light, the precise alignment relative to the microstructures and the light emitter's filaments can be determined and therefore the microstructures can be optimised to refract light in such as way that it becomes trapped inside the element 12 and so that the light from each light emitter spreads inside the light transmissive means 12 defined in specific angles. The light coupling points and their specific light emitting angles can be optimised to create a desired light intensity distribution in the light transmissive means 12 that increases with distance from the sensor 16 and the touching object. As fingers and other scattering/diffusing objects reflect light partly specularly and partly Lambertian, the light intensity pattern around a finger will be higher in the direction away from one or more light emitting points. Therefore, is it beneficial to have the sensor 16 in one corner of the means 12 and to locate at least two light coupling points 60 and blinders 62 near the opposite corner.

In FIG. 1, a force sensor 90 is illustrated below the means 12. In fact, four force sensors 90, such as strain gauge meters, may be placed between the touch sensitive surface and a base, so that whenever the touch sensitive surface is touched, the force sensors will output a signal corresponding to the force applied and transmit this signal to a processing system.

The force sensors 90 or at least one of them can be adapted to click so there is both a tactile and an audible response to an applied force that surpasses a defined threshold.

The processing system can be set to output signal to a vibrating motor or speaker corresponding to an applied force above a certain threshold combined with a set position detection corresponding to a certain key and in this way provide the user with unique tactile feedback corresponding to unique keys.

In order to minimise the power consumption of the CCD position detection system, the force sensors 90 are set to switch the CCD position detection on as soon as a certain applied force threshold is reached, and the CCD position detection system is set to switch off after an idle period without applied force.

Signals from the force sensors 90 concerning the applied force can be transmitted to the processing system and be used there to determine drawing tools applied pressure in order to mimic how various drawing tools such as brushes, pens, pencils, colour pens, paint brush etc. change line width and colouration intensity.

When a point touch is touched by a stylus force activators such as strain gauges can measure the applied force. The applied force information adds z axis to the x axis and the y axis. Having three axes, it becomes possible to do more precise handwriting recognition and to mimic use of drawing tools such a brushes, markers and every other drawing tool that alters line thickness or colouration according to applied pressure.

Figure 10:
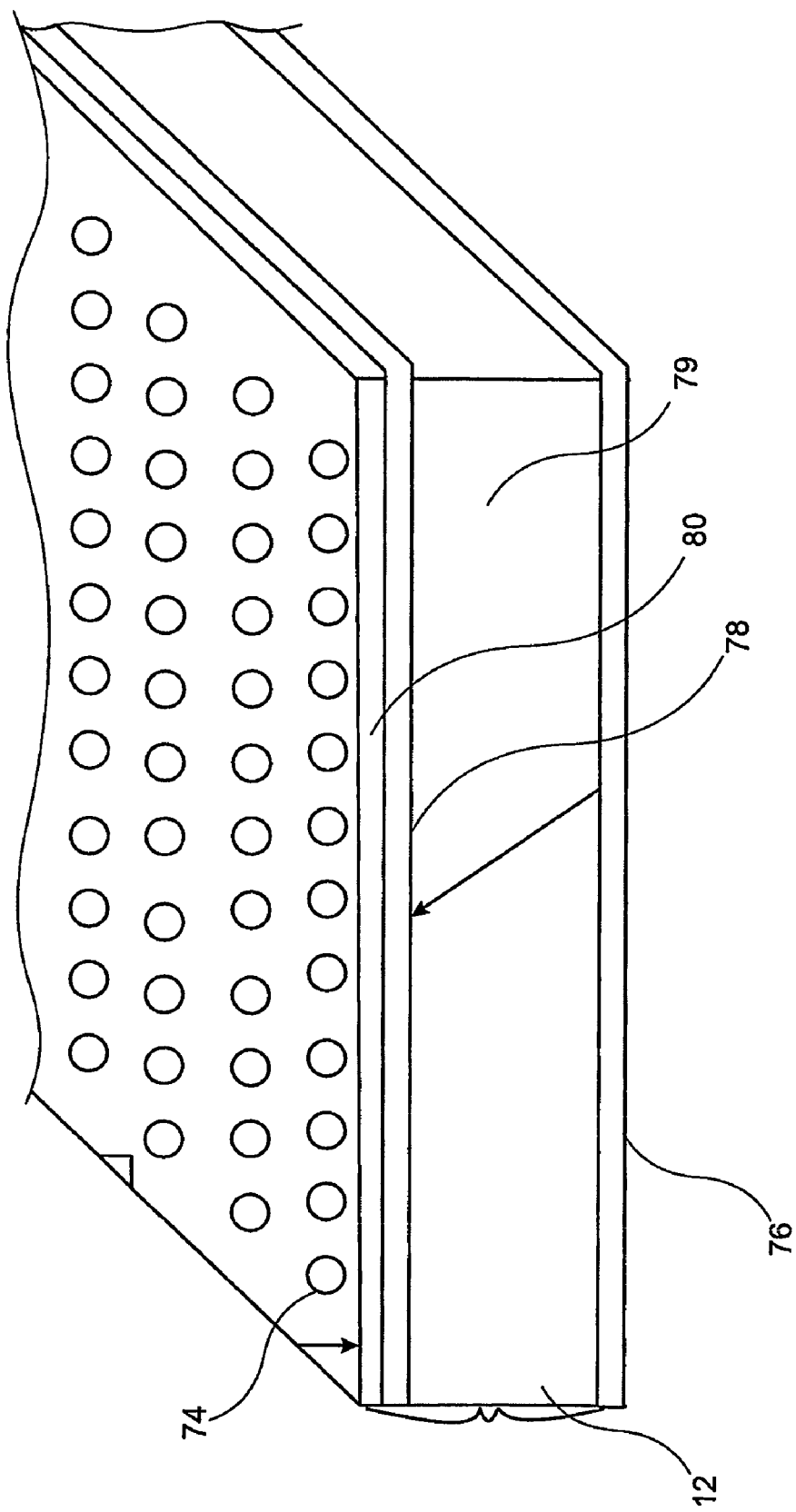
FIGS. 10 and 11 illustrate a particular embodiment with a reflector with openings.
Figure 11:
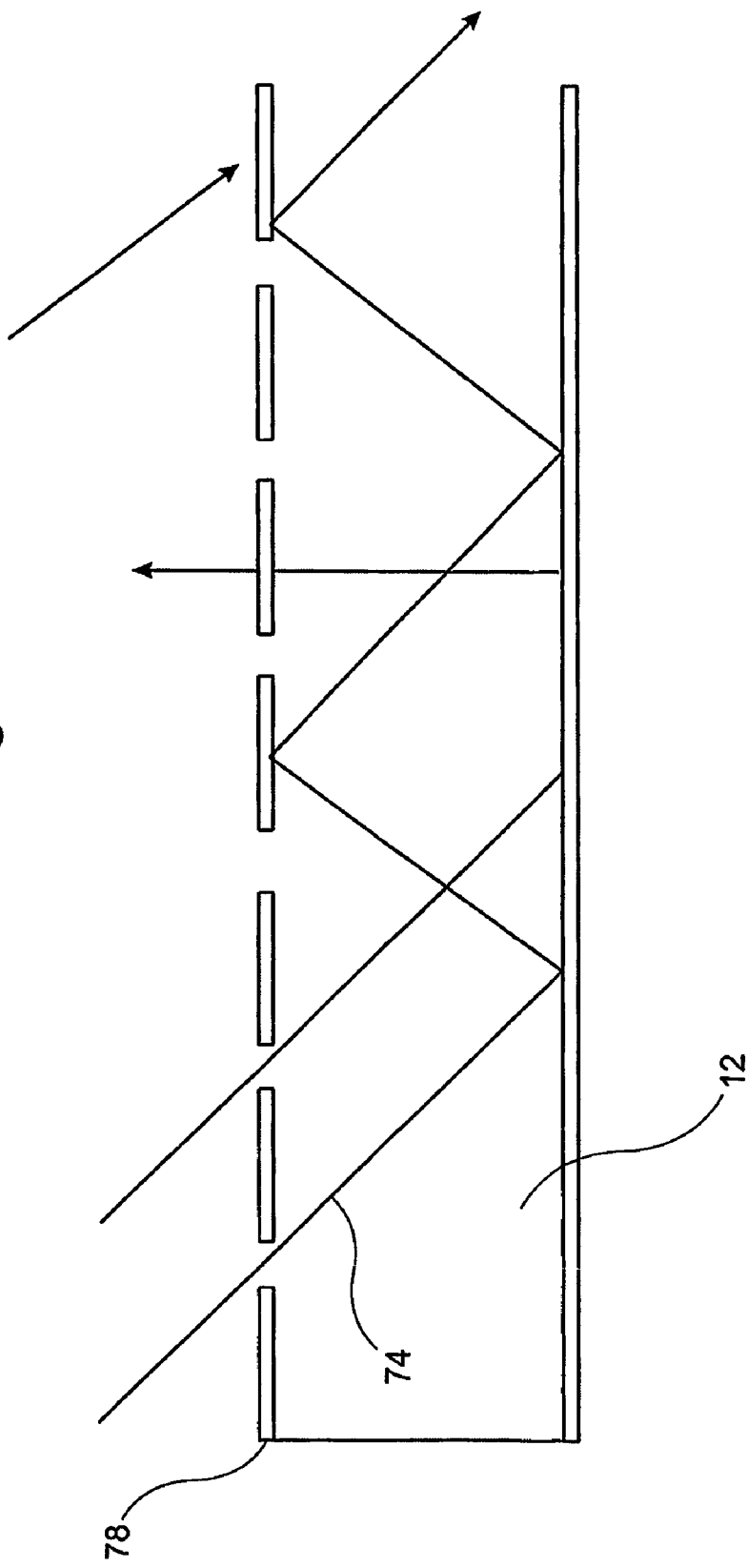

In FIG. 10, the light transmissive means 12 has four layers: a first light transmissive layer 80 that permits light to enter, a second up to 100% reflective layer 78 with holes 74, a third light transmissive layer 79, and a fourth up to 100% reflective layer 76.

In a preferred embodiment, the reflective layer 76 is laminated to a screen/monitor and both the reflective layers 78 and 76 are produced so they are light transmissive or reflective at a particular wavelength (narrow interval, e.g.) so that only a preferred wavelength is captured as internal reflection between the two reflective layers 76 and 78 and thus transmitted as internal reflections to a sensor and the two light transmissive layers 80 and 79 are both transparent. The reflective layer 76 can be laminated to a screen/monitor surface such as for instance an OLED screen and/or have an oxygen barrier that protects the mirror from oxidation. When the reflective layer 76 is inserted between a screen/monitor and the rest of the light transmissive means 12 the signal carrying wavelength is not affected by the microstructures of the OLED and the light emitted from the OLED in the visible spectrum is not affected by the light transmissive means 12.

When light is sent towards the light transmissive means 12, a proportion will be deflected as a consequence of the Brewster angle phenomenon and another proportion of the light enter the light transmissive means, where it will pass through to the reflective layer 78 or through the holes 74 where all wavelengths will pass, until it meets the reflective layer 80 where only the wavelengths not reflected by the reflective layer 80 will pass. The rest of the light will be reflected towards the reflective layer 78 and thus transmitted as internal reflections until it is detected by the sensor 16 or either absorbed or sent out of the light transmissive means 12 via a hole 74. In this way, only light of a preferred wavelength corresponding with the active light sources controlled by the system will be able to propagate as internal reflections and total internal reflections to the sensor 16.

The light from reflective objects 14 that is detected must pass through holes 74 in line of sight from the sensor 16 to be detected. Light that is not within line of sight for the sensor 16 will flow inside the light transmissive means 12 until it is either absorbed or sent out again. The distance to a reflective object 14 can be measured by detecting the position of all the holes in the line of sight to the reflective object 14. The first hole 74 in the line of sight is the first one where the light from the reflective object is not deflected as a consequence of the Brewster angle phenomenon, and the last hole 74 in the line of sight is last one where the light can propagate forward as internal reflection to the sensor 16. The next hole in the line of sight will receive light but forward is in a direction directly away from the detector.

This gives information on two angles and thus information enough to do a simple triangulation. This triangulation process can further be supported by information of the light intensity distribution between the holes 74 the in line of sight because it is expected that steep internal reflections will, as will be the case for the last few holes 74 within the line of sight, lead to greater reflection loss and loss through other holes and that holes 74 further distanced from the reflective object 74 will receive less light due to the gradual increase of deflection from the surface and due to that light decreases as a function of the distance.

The detection of reflective objects 14 prior to (or just not having) surface contact can be enhanced by controlling light sources that emit light in close proximity to the said surface.

When a reflective object 14 comes into contact with the surface light in the preferred wavelength propagating in the light transmissive means 12 will be scattered/reflected by the reflective object 14. These scattered reflections will both travel as TIR and internal reflections and will thus be amplified and create better contrast.

When a reflective object 14, having a surface that does not provide sufficient optical contact to the light transmissive means 12, comes into contact with the surface then the scattered/reflected light can be insufficient to detect touch through extra TIR and internal reflection signal. Instead, the force sensors can be used in combination with the prior surface detection can position a touch by a reflective object 14 and thus enable the system to recognise gloved touch which today is a special feature for infrared optical and NFI touch screens.

The optical amplification achieved by introducing the reflective layer 78 affects all types of reflections and thus both the signal and the noise.

In one embodiment, the optical amplification can be further enhanced by letting the surface layer 80 of the light transmissive means be of a type that can be manipulated to form indents around touching objects.

Alternatively, the reflective layers 78 and 76 can be 100% mirrors and the light transmissive layers 80 and 79 can be selectively transmissive for specific wavelengths only so it becomes possible to produce an optical touch screen based on the principle that can be coloured including prints on the surface as long as the preferred signal carrying wavelength are not interrupted on their way to the sensor 16.

The invention claimed is:

1. A system for determining a position of a radiation reflecting/scattering element, the system comprising:
   a transmissive element or plate having a first surface part adapted to be engaged by the reflecting/scattering element and a second surface part being opposite to the first surface part,
   a radiating element adapted to provide radiation into the transmissive element and onto the first surface part,
   a detector adapted to detect radiation provided by the radiating element and that is reflected/scattered by the reflecting/scattering element when engaging the first surface part at a position thereof and outputting a signal relating to an angle of incidence of the radiation, the transmissive element being adapted to guide the reflected/scattered light via total internal reflection to the detector, the detector being at least one at least one-dimensional detector having a plurality of detecting elements each being adapted to detect radiation and to output a corresponding signal,
   at least one aperture, pinhole, or lens arranged between the transmissive element and the detector and adapted to modulate radiation incident on the detecting elements, and
   a determining element adapted to determine, on the basis of angle signal, a position of engagement of the reflecting/scattering element on the first surface part.

2. A system according to claim 1, wherein the radiating element comprises a reflecting element adapted to reflect radiation that penetrates the transmissive element from the first surface part to the second surface part back into the transmissive element.

3. A system according to claim 1, wherein the radiating element is a monitor or screen positioned at a second surface part of the transmissive element opposite to the first surface part and in a manner so as to emit radiation through the transmissive element onto the first surface part.

4. A system according to claim 3, wherein the monitor or screen is adapted to provide radiation of different characteristics onto different areas of the first surface part.

5. A system according to claim 3, wherein the transmissive element further comprises a converting element adapted to convert radiation from the monitor or screen, the converting element being adapted to provide radiation of different characteristics onto different areas of the first surface part, and the detecting elements being adapted to detect the different characteristics.

6. A system according to claim 1, wherein the transmissive element has a shape of a plate or sheet, the system further comprising a transferring element adapted to engage with the transmissive element so as to transfer radiation transmitted by the transmissive element to the detector.

7. A system according to claim 3, wherein the transmissive element comprises, at the first surface part thereof, a converting element adapted to convert radiation from the monitor or screen and reflected/scattered by the reflecting/scattering element, the converting element being adapted to provide radiation of different characteristics from different areas of the first surface part, and the detecting elements being adapted to detect the different characteristics.

8. A system according to claim 1, further comprising a filtering element adapted to filter radiation incident on the detecting elements.

9. A system according to claim 1, further comprising a second reflecting/scattering element, positioned at the second surface part, adapted to reflect or scatter radiation having a first wavelength and being incident thereon from the first surface part and from a first angle to the first surface part to a direction inside the transmissive element and having a second angle to the first surface part, the second angle being lower than the first angle.

10. A system according to claim 9, wherein the second reflecting/scattering element being provided in predetermined areas over the second surface area.

11. A system according to claim 10, wherein the detector and the predetermined areas are provided at positions so that, from each of a number of the predetermined areas, no other predetermined area exists along a straight line between the predetermined area and the detector.

12. A system according to claim 9, wherein the second reflecting/scattering element is adapted to reflect radiation having a second wavelength, being different from the first wavelength, and having a third angle to the first surface part, back toward the first surface part at an angle being at least substantially equal to the third angle.

13. A system according to claim 1, further comprising a second reflecting/scattering element adapted to provide the radiation to a predetermined area of the first surface part, the second reflecting/scattering element being adapted to prevent radiation onto areas adjacent to the predetermined area.

14. A system according to claim 13, wherein the second reflecting/scattering element comprises a radiation blocking area at or on adjacent areas of the first surface part.

15. A system according to claim 13, wherein the predetermined area is oblong shaped.

16. A system according to claim 15, wherein the predetermined area has a length of approximately ½-20cm.

17. A system according to claim 1, further comprising:
one or more radiation emitters adapted to transmit electromagnetic radiation into the transmissive element and toward the first surface thereof, and
an element adapted to prevent radiation from traveling directly from the emitters to the detector.

18. A system according to claim 1, further comprising a force sensing element adapted to sense a force applied by the reflecting/scattering element onto the transmissive element.

19. A system according to claim 2, further comprising a reflective element extending in a direction of the first surface part, and having a plurality of predetermined areas, the reflective element being adapted to, in the areas, provide radiation transmission from the first surface part toward the second surface part and, outside the areas, provide reflection of radiation traveling from the second surface part toward the first surface part back toward the second surface part.

20. A method for determining a position of a radiation reflecting/scattering element, the method comprising:
providing radiation into a transmissive element or plate and onto a first surface part thereof, the transmissive element having a second surface part being opposite to the first surface part,
providing engagement between the reflecting/scattering element and the first surface part of the transmissive element,
guiding the reflected/scattered light via total internal reflection in the transmissive element to a detecting means being at least one at least one-dimensional detector having a plurality of detecting elements each detecting the radiation and outputting a corresponding signal,
modulating radiation incident on the detecting means with at least one aperture, pinhole, or lens arranged between the transmissive element and the detector,
detecting using the detecting means, radiation which is provided into the transmissive element and reflected/scattered by the reflecting/scattering element engaging the first surface part at a position thereof, and modulated by the at least one aperture, pinhole, or lens, and providing a signal relating to an angle of incidence of the radiation, and
determining, on the basis of the angle signal, a position of engagement of the reflecting/scattering element on the first surface part.

21. A method according to claim 20, wherein the radiation providing step comprises reflecting the radiation that penetrates the transmissive element from the first surface part to the second surface part back into the transmissive element.

22. A method according to claim 20, wherein the radiation providing step comprises providing the radiation from a monitor or screen positioned at a second surface part of the transmissive element opposite to the first surface part in a manner so that radiation is emitted through the transmissive element onto the first surface part.

23. A method according to claim 22, wherein the monitor or screen provides radiation of different characteristics onto different areas of the first surface part.

24. A method according to claim 22, wherein the radiation providing step comprises converting radiation from the monitor or screen, the converting step includes providing radiation of different characteristics onto different areas of the first surface part, and the detecting step includes detecting the different characteristics.

25. A method according to claim 20, wherein the transmissive element has a shape of a plate or sheet, and the detecting step includes transferring radiation transmitted by the transmissive element to the detector.

26. A method according to claim 22, further comprising the step of converting, at the first surface part, radiation from the monitor or screen and reflected/scattered by the reflecting/scattering element, wherein the converting step includes providing radiation of different characteristics from different areas of the first surface part, and the detecting step includes detecting the different characteristics.

27. A method according to claim 20, wherein the detecting step comprises filtering radiation incident on the detecting elements.

28. A method according to claim 20, further comprising a second step of reflecting/scattering, at the second surface part, radiation having a first wavelength and being incident thereon from the first surface part and from a first angle to the first surface part to a direction inside the transmissive element and having a second angle to the first surface part, the second angle being lower than the first angle.

29. A method according to claim 28, wherein the second reflecting/scattering step is performed in predetermined areas over the second surface area.

30. A method according to claim 29, further comprising positioning the detecting means and the predetermined areas at positions so that, from each of a number of the predetermined areas, no other predetermined area exists along a straight line between the predetermined area and the detecting means.

31. A method according to claim 28, wherein the second reflecting/scattering step comprises reflecting radiation having a second wavelength being different from the first wavelength and having a third angle to the first surface part, back toward the first surface part at an angle being at least substantially equal to the third angle.

32. A method according to claim 20, wherein the providing step further comprises providing the radiation to a predetermined area of the first surface part, the second providing step includes preventing radiation onto areas adjacent to the predetermined area.

33. A method according to claim 32, wherein the second providing step comprises preventing or blocking radiation at or on adjacent areas of the first surface part.

34. A method according to claim 32, wherein the providing step comprises providing the radiation to an oblong area.

35. A method according to claim 34, wherein providing step comprises providing the radiation to an oblong area having a length of approximately ½-20cm.

36. A method according to 20, further comprising the steps of:
one or more radiation emitters transmitting electromagnetic radiation into the transmissive element and toward the first surface thereof,and
preventing radiation from traveling directly from the emitters to the detector.

37. A method according to claim 20, further comprising the step of sensing a force applied by the reflecting/scattering element onto the transmissive element.

38. A method according to claim 21, further comprising the steps of:

providing a reflective element extending in a direction of the first surface part, and having a plurality of predetermined areas, the reflective element includes:

facilitating radiation transmission, in the areas, from the first surface part toward the second surface parts, and reflecting, outside the areas, radiation traveling from the second surface part toward the first surface part back toward the second surface part.

39. A system for determining the a position of a radiation emitting/reflecting/scattering element, the system comprising:

a transmissive element or plate having a first surface part and a second surface part being opposite to the first surface part, a first reflective element extending in a direction of the first surface part and having one or more predetermined areas, the reflective element being adapted to, in each area, provide radiation transmission from the first surface toward the second surface part and, outside the area(s), reflect radiation traveling from the second surface part toward the first surface back toward the second surface part, a second reflective element extending in a direction of the first surface part and being adapted to reflect radiation traveling in the transmissive element from the first reflective element toward the second surface part back toward the first surface part and the first reflective element, a detector, the detector being at least one at least one-dimensional detector having a plurality of detecting elements each being adapted to detect radiation and to output a corresponding signal, at least one aperture, pinhole, or lens arranged between the transmissive plate and the detector and adapted to modulate radiation incident on the detecting elements, the detector being adapted to:

detect radiation from the emitting/reflecting/scattering element, which radiation has entered the transmissive element, passed through an area of the first reflective element and has been reflected toward the detector by the first and second reflective element, and output a signal relating to an angle of incidence of the radiation, to a determining element adapted to determine, on the basis of the angle signal, a position of the emitting/reflecting/scattering element in relation to the first surface part.

40. A system according to claim 39, further comprising a radiating element adapted to provide radiation towards the emitting/reflecting/scattering element.

41. A method of determining a position of a radiation emitting/reflecting/scattering element, the method comprising:

providing a transmissive element or plate having a first surface part and a second surface part being opposite to the first surface part, providing a first reflective element extending in a direction of the first surface part, and having a plurality of predetermined areas, providing a second reflective element extending in a direction of the first surface part, providing a detecting means including at least one at least one-dimensional detector having a plurality of detecting elements each being adapted to detect radiation and to output a corresponding signal, receiving radiation from the emitting/reflecting/scattering element into the transmissive element, through an area, and toward the second reflective element, the first and second reflective elements subsequently reflecting at least part of the received radiation toward the detecting means, modulating radiation incident on the detecting elements with at least one aperture, pinhole, or lens arranged between the transmissive element and the detecting means, detecting modulated radiation and outputting a signal relating to an angle of incidence of the radiation, and determining, on the basis of the angle signal, a position of the emitting/reflecting/scattering element in relation to the first surface part.

42. A method according to claim 41, the method further comprising the step of providing radiation toward the emitting/reflecting/scattering element.

* * * * *

UNITED STATES PATENT AND TRADEMARK OFFICE
CERTIFICATE OF CORRECTION

PATENT NO.        : 7,465,914 B2
APPLICATION NO.   : 10/571567
DATED             : December 16, 2008
INVENTOR(S)       : Jonas Ove Philip Eliasson et al.

Page 1 of 1

It is certified that error appears in the above-identified patent and that said Letters Patent is hereby corrected as shown below:

On the title page item [60] insert:

--Related U.S. Application Data

[60] Provisional Application No. 60/502,245, filed on September 12, 2003.--

Signed and Sealed this

Twenty-fourth Day of February, 2009

JOHN DOLL
*Acting Director of the United States Patent and Trademark Office*